(12) United States Patent
Otani et al.

(10) Patent No.: US 6,807,814 B1
(45) Date of Patent: Oct. 26, 2004

(54) APPARATUS FOR DETECTING AN AMOUNT OF STORED ICE

(75) Inventors: Teruhiko Otani, Aichi-ken (JP);
Masayuki Kuroyanagi, Aichi-ken (JP);
Motohiro Kawachi, Aichi-ken (JP);
Takashi Hibino, Aichi-ken (JP)

(73) Assignee: Hoshizaki Denki Kabushiki Kaisha, Toyoake (JP)

( * ) Notice: Subject to any disclaimer, the term of this patent is extended or adjusted under 35 U.S.C. 154(b) by 0 days.

(21) Appl. No.: 10/442,204

(22) Filed: May 21, 2003

(51) Int. Cl.[7] ................................................. F25C 5/18
(52) U.S. Cl. ................................................. 62/137; 62/344
(58) Field of Search ................................... 62/137, 344

(56) References Cited

U.S. PATENT DOCUMENTS

| | | | | |
|---|---|---|---|---|
| 3,877,241 A | * | 4/1975 | Wade | 62/137 |
| 4,610,147 A | * | 9/1986 | Kawasumi | 62/137 |
| 4,662,182 A | * | 5/1987 | Tsukiyama et al. | 62/137 |
| 4,947,652 A | * | 8/1990 | Arcangeli | 62/71 |
| 5,253,480 A | * | 10/1993 | Sakai | 62/78 |

* cited by examiner

*Primary Examiner*—William E. Tapolcai
(74) *Attorney, Agent, or Firm*—Wenderoth, Lind & Ponack, L.L.P.

(57) ABSTRACT

A pair of claw portions that may be elastically deformed are formed at both ends of a top surface of a base body of a detecting plate base. A circular arc portion and a switch holding portion are formed between the pair of claw portions. A recessed portion is formed on the lower surface side of the base body by the circular arc portion so that a detecting plate, which is mounted on the detecting plate base, may be rotated. A lead switch is attachably and detachably mounted on the switch holding portion. An apparatus for detecting an amount of stored ice is attachably and detachably fitted from the interior of the ice storing chamber to an opening portion formed in the top plate of the ice storing chamber by the claw portions of the detecting plate base.

9 Claims, 10 Drawing Sheets

APPARATUS FOR DETECTING AN AMOUNT OF STORED ICE

BACKGROUND OF THE INVENTION

1. Field of the Invention

The present invention relates to an apparatus for detecting an amount of stored ice, and more particularly to an apparatus for detecting an amount of stored ice mounted on a top plate of an ice storing chamber of an automatic ice maker.

2. Description of the Related Art

Figure 15:
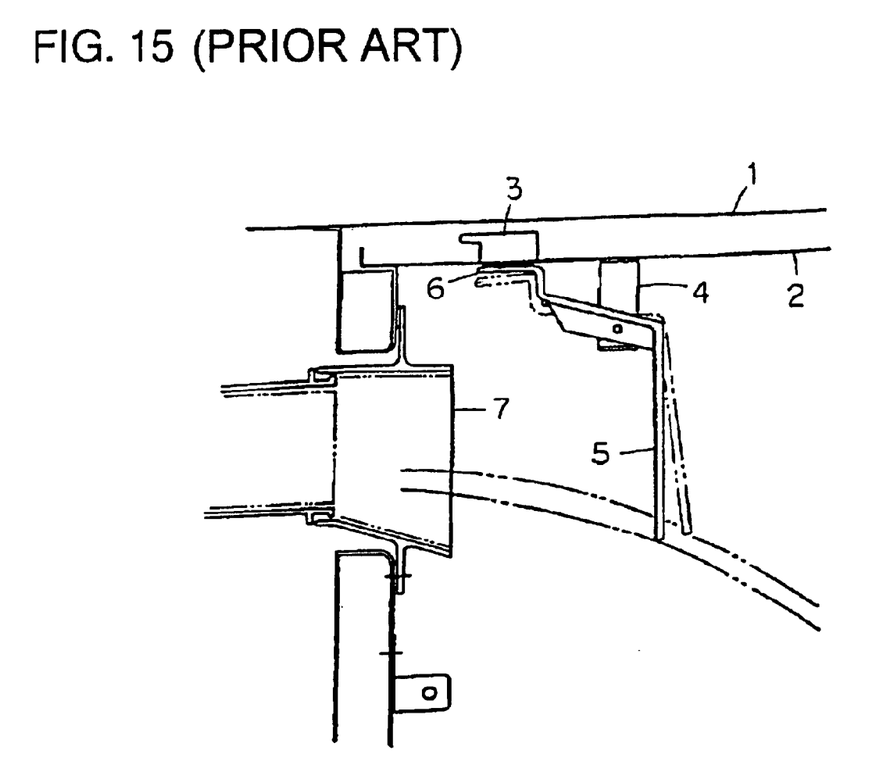
FIG. 15 is a partial cross-sectional view showing a structure of an ice maker provided with a conventional apparatus for detecting an amount of stored ice.

FIG. 15 shows a conventional apparatus for detecting an amount of stored ice. A shield plate 2, made of non-magnetic material, is provided inside a ceiling plate 1 of the ice storing chamber within an ice maker. A non-contact switch 3 is fixed to a top surface of the shield plate 2. Also, a detecting plate 5 is rotatably mounted to a support member 4 fixed to a lower surface of the shield plate 2. An assist plate 6, which is made of magnetic material, is provided at one end of the detecting plate 5 so as to face the non-contact switch 3. Normally, the detecting plate 5 is located in a position indicated by the solid line whereby the position of the assist plate 6, i.e., the position of the detecting plate 5 may be recognized by the non-contact switch 3. In this case, the amount of ice stored in the ice storing chamber through an ice feed outlet 7 is increased, the detecting plate 5 is rotated as indicated by a dotted line by the ice. As a result, the assist plate 6 is moved away from the non-contact switch 3 so that the state in which the chamber is fully filled with ice is detected by the non-contact switch 3.

In an under-counter type automatic ice maker, since the user puts articles or machines on the ceiling plate 1 or a counter is located immediately above the ceiling plate 1, there are situations in which the ceiling plate 1 could not be removed with ease for maintenance. Accordingly, when the non-contact switch 3 or the detecting plate 5 of the apparatus for detecting an amount of stored ice is broken down or contaminated due to some reason, the exchange, repair, cleaning or the like of these components is performed from the interior of the ice storing chamber without removing the ceiling plate 1.

However, since the non-contact switch 3 and the support member 4 of the detecting plate 5 are fixed to the shield plate 2 by fastening components such as screws, it is impossible to easily remove them from the interior of the ice storing chamber and thus the maintenance is troublesome.

Also, if screws made of metal are used as the fastening components, there is a fear of corrosion such as rust.

SUMMARY OF THE INVENTION

In order to solve such problems, an object of the present invention is to provide an apparatus for detecting an amount of stored ice that may be mounted on a ceiling portion of an ice storing chamber without using any fastening component but may readily be removed from the interior of the ice storing chamber.

The apparatus for detecting an amount of stored ice according to this invention comprises a detecting plate base that is attachably and detachably fitted from an interior of an ice storing chamber to an opening portion formed in a wall surface of the interior of the ice storing chamber and a detecting means mounted on the detecting plate base for detecting a state in which a predetermined amount of ice is stored in the ice storing chamber.

The detecting means may include a detecting plate mounted on the detecting plate base so as to be rotated by the ice when the predetermined amount of ice is stored in the ice storing chamber and a switch for detecting the rotation of the detecting plate. The detecting plate has an arm portion that may be elastically deformed and a boss formed in the arm portion is loosely fitted in a hole formed in the detecting plate base. The detecting plate base has a guard for covering the arm portion of the detecting plate.

Preferably, the detecting plate base has a lead line fastening portion that is received in a recessed portion formed adjacent to the opening portion in the top plate of the ice receiving chamber for fixing an intermediate portion of the lead line connected to the switch.

Also, a heat insulating material may be fitted attachably and detachably from the interior of the ice storing chamber above the detecting plate base within the opening portion of the top plate of the ice storing chamber.

DETAILED DESCRIPTION OF THE PREFERRED EMBODIMENTS

An embodiment of the present invention will now be described with reference to the accompanying drawings.

Figure 1:
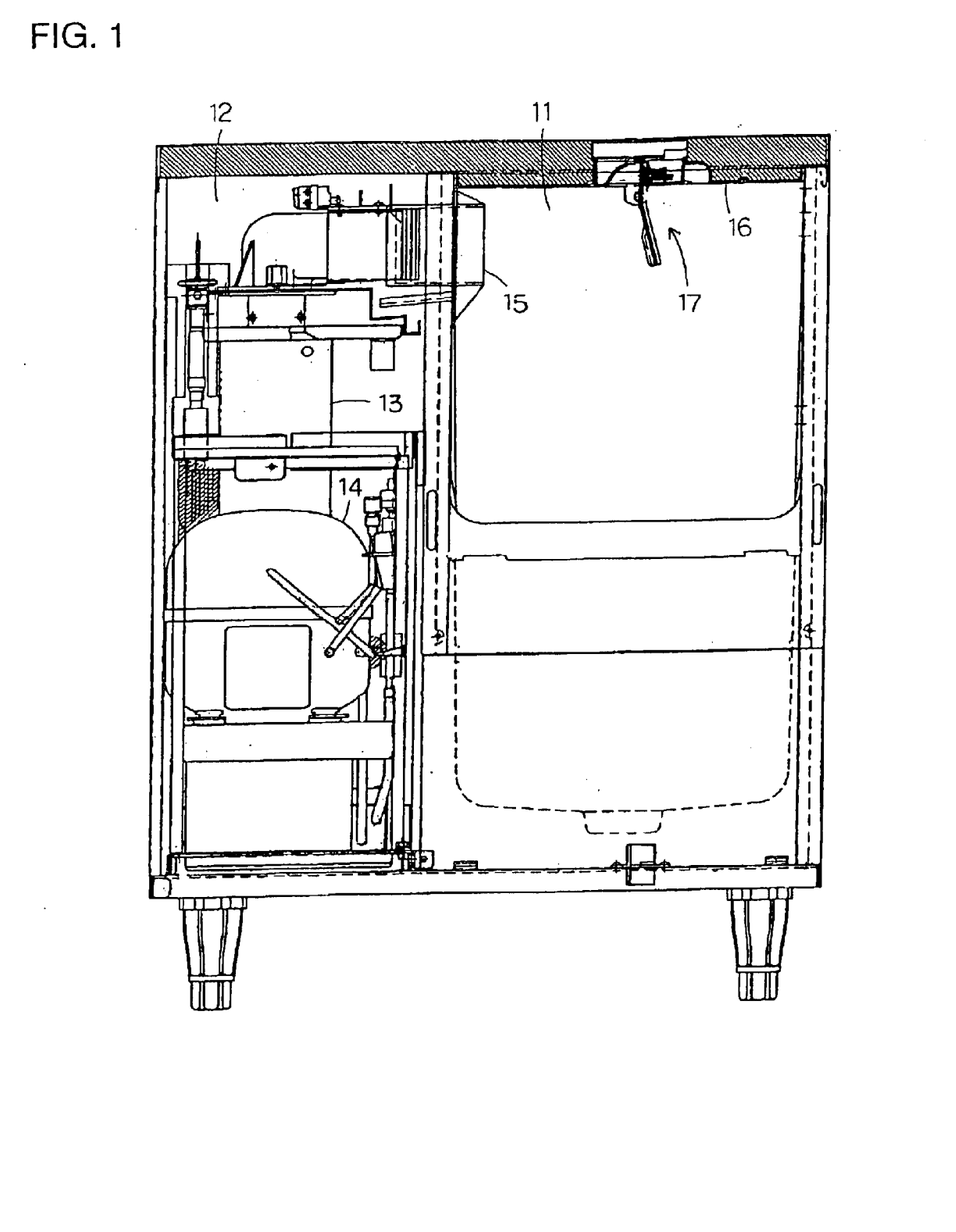
FIG. 1 is a cross-sectional view of an ice maker provided with an apparatus for detecting an amount of stored ice in accordance with an embodiment of the present invention.

A structure of an ice maker provided with an apparatus for detecting an amount of stored ice in accordance with an embodiment of the present invention is shown in FIG. 1. An interior of an ice maker is roughly divided into an ice storing chamber 11 and a machine chamber 12. The ice storing chamber 11 is surrounded by heat insulating material. An ice making portion 13 having an auger, a motor for rotating the auger, and a compressor 14 and others constituting a refrigerating circuit are contained in the machine chamber 12. The ice made in the ice maker 13 is discharged from an ice feed outlet 15 to the ice storing chamber 11 to be stored therein.

Figure 2:
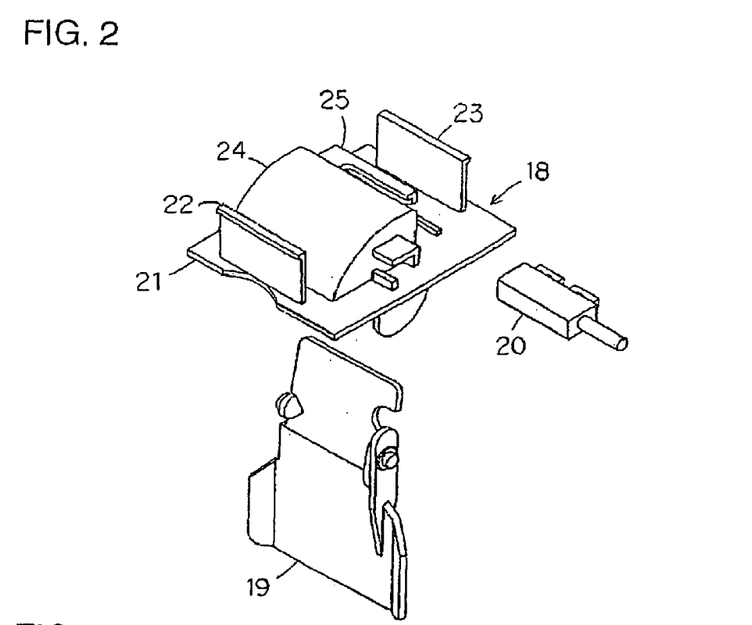
FIG. 2 is an exploded view showing the apparatus for detecting an amount of stored ice according to the embodiment.

The apparatus for detecting an amount of stored ice 17 is mounted on a top plate 16 of the ice storing chamber 11. As shown in FIG. 2, the apparatus for detecting an amount of stored ice 17 has a detecting plate base 18, a detecting plate 19 to be mounted on this detecting plate base 18 and a lead switch 20. The detecting plate base 18 is made of molded resin. A pair of claw portions 22 and 23 that may be elastically deformed are formed on both ends on a top surface of a planar base body 21. A circular arc portion 24 and a switch holding portion 25 are formed between these claw portions 22 and 23. The circular arc portion 24 is adapted to form a recessed portion on the lower surface side of the base body 21, i.e., on the side of the ice storing chamber 11 for making it possible to rotate the detecting plate 19 mounted on the detecting plate base 18. The switch holding portion 25 is adapted to attachably and detachably mount the lead switch 20 on the top surface of the base body 21.

Figure 3A:
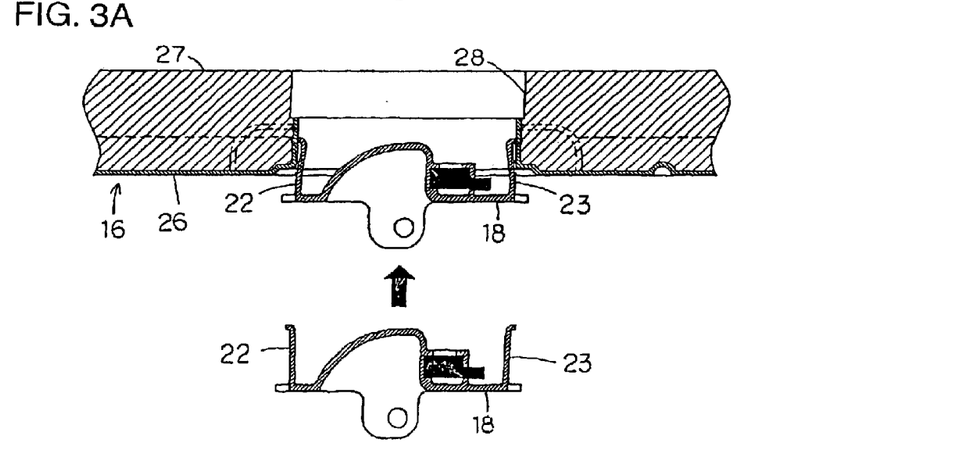
FIGS. 3A and 3B are cross-sectional views showing an intermediate condition and a mounting completed condition when a detecting plate base is mounted onto a top plate of an ice storing chamber, respectively.

As shown in FIG. 3A, the top plate 16 of the ice storing chamber 11 has a resin portion 26 facing the ice storing chamber 11 and a heat insulating portion 27 formed on the resin portion 26. An opening portion 28 is formed in the resin portion 26 and the heat insulating portion 27 for mounting the apparatus for detecting an amount of stored ice 17. An opening end portion of the resin portion 26 is bent substantially perpendicularly along an inner side surface of the opening portion 28.

Figure 3B:
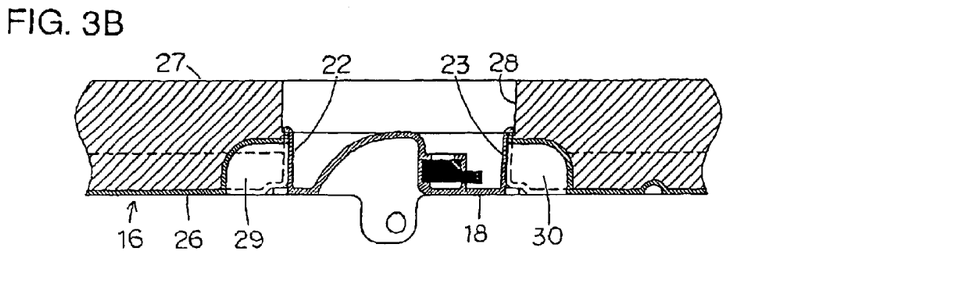

When the detecting plate base 18 is inserted from the interior of the ice storing chamber 11 into this opening portion 28 under the condition that the pair of claw portions 22 and 23 is deformed inwardly toward each other, the detecting plate base 18 is advanced upwardly within the opening portion 28 while the claw portions 22 and 23 are elastically deformed. When the tip ends of the claw portions 22 and 23 reach the opening end portions of the resin portion 26 of the top plate 16, as shown in FIG. 3B, the elastic deformation is released and the claw portions 22 and 23 are engaged with the opening end portions of the resin portion 26. With this engagement, the detecting plate base 18 prevented from falling out of the opening portion 28. Also, the flow communication of air between the interior and the exterior of the ice storing chamber 11 is interrupted by the existence of the top plate 16 and the detecting plate base 18.

A pair of recessed finger insertion portions 29 and 30 are formed in the top plate 16 adjacent to the opening portion 28. The fingers are inserted into these finger insertion portions 29 and 30, respectively, to push the claw portions 22 and 23 to be elastically deformed inwardly toward each other so that the engagement between the claw portions 22 and 23 and the opening end portions of the resin portion 26 is released and then the detecting plate base 18 may be removed from the opening portion 28.

Figure 4A:
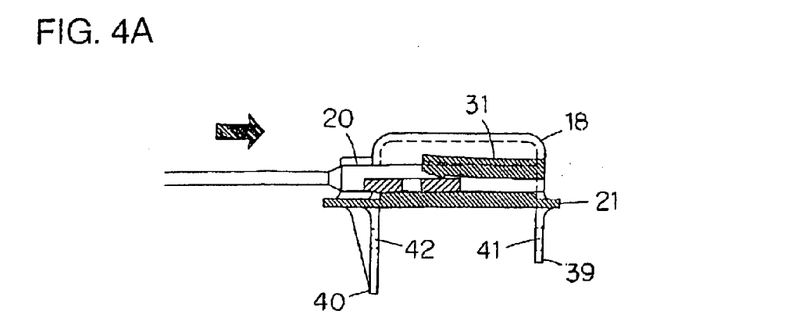
FIGS. 4A and 4B are cross-sectional views showing an intermediate condition and a mounting completed condition when a lead switch is mounted into a switch holding portion of the detecting plate base, respectively.
Figure 4B:
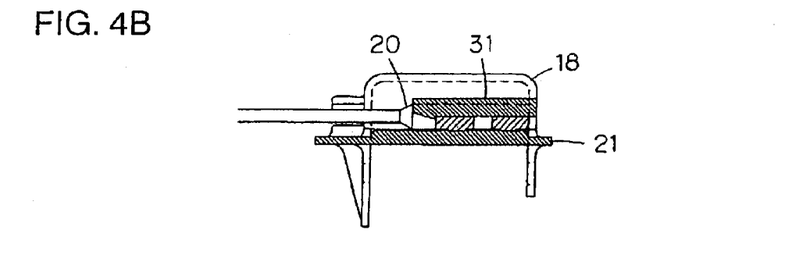

As shown in FIG. 4A, the switch holding portion 25 of the detecting plate base 18 has a pressing portion 31 that extends in parallel with the surface of the base body 21 and may be elastically deformed. A claw portion is formed to project from the lower surface of a tip end of this pressing portion 31. When the lead switch 20 is inserted into the switch holding portion 25 along the surface of the base body 21, the claw portion rides on the lead switch 20 so that the pressing portion 31 is elastically deformed. When the lead switch 20 is fully inserted, as shown in FIG. 4B, the claw portion of the pressing portion 31 is engaged with an edge of the lead switch 20 to release the elastic deformation of the pressing portion 31. With this engagement, the lead switch 20 is prevented from falling off the switch holding portion 25.

The pressing portion 31 is lifted at its end upwardly to release the engagement between the claw portion and the lead switch 20, and thereby the lead switch 20 may be drawn off from the switch holding portion 25.

Figure 5A:
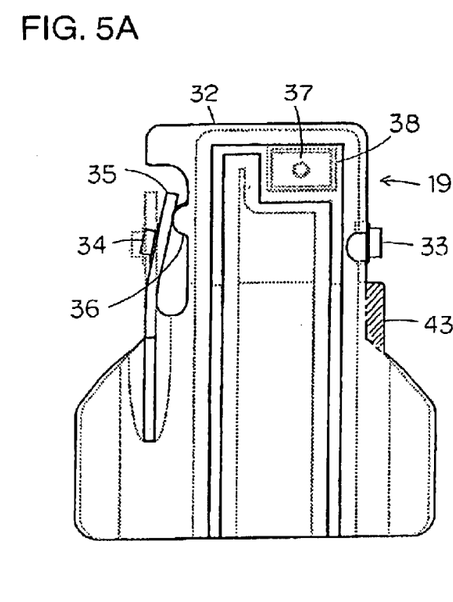
FIGS. 5A and 5B are a front view and an exploded side view showing the detecting plate, respectively.
Figure 5B:
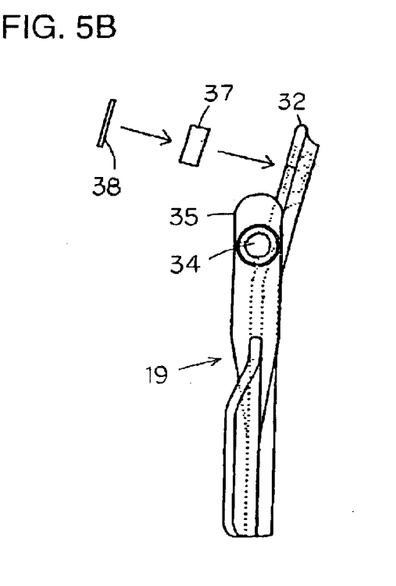

As shown in FIG. 5A, the detecting plate 19 is made of molded resin and has a substantially flat detecting plate body 32 and a pair of bosses 33 and 34 aligned in a line and projecting outwardly from each other. The boss 33 is formed directly on the side wall of the detecting body 32 while the other boss 34 is formed or an arm portion 35 which extends from the detecting plate body 32 and may be elastically deformed. A distance between the pair of bosses 33 and 34 may be varied due to the elastic deformation of the arm portion 35. Also, a bend stop 36 is formed on the detecting plate body 32 so as to avoid excessive deformation of the arm portion 35. Furthermore, as shown in FIG. 5B, a magnet 37 is embedded at the tip end portion of the detecting plate body 32 and is covered by a cover member 38.

Figure 6A:
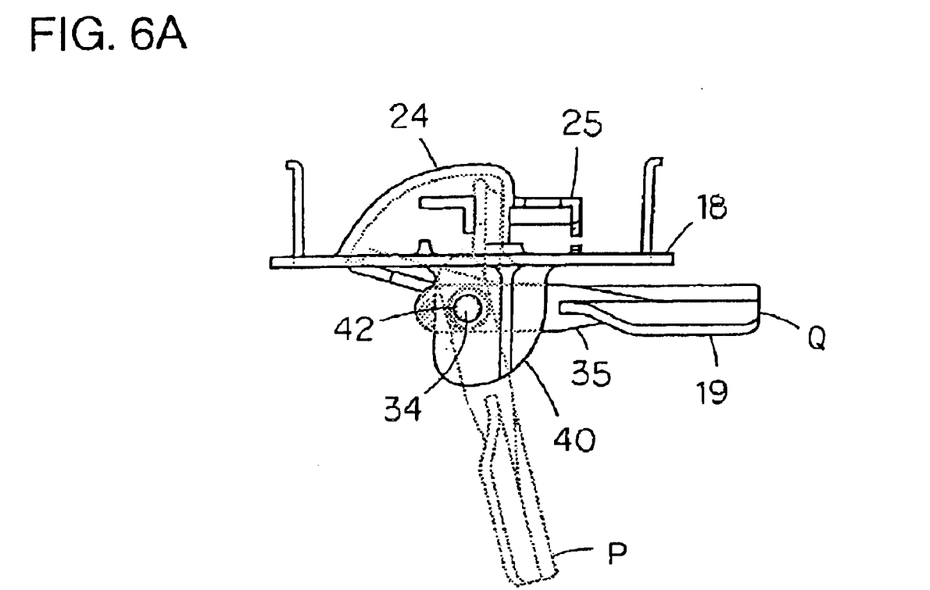
FIGS. 6A and 6B are one side view and the other side view showing the detecting plate base on which the detecting plate is mounted, respectively.
Figure 6B:
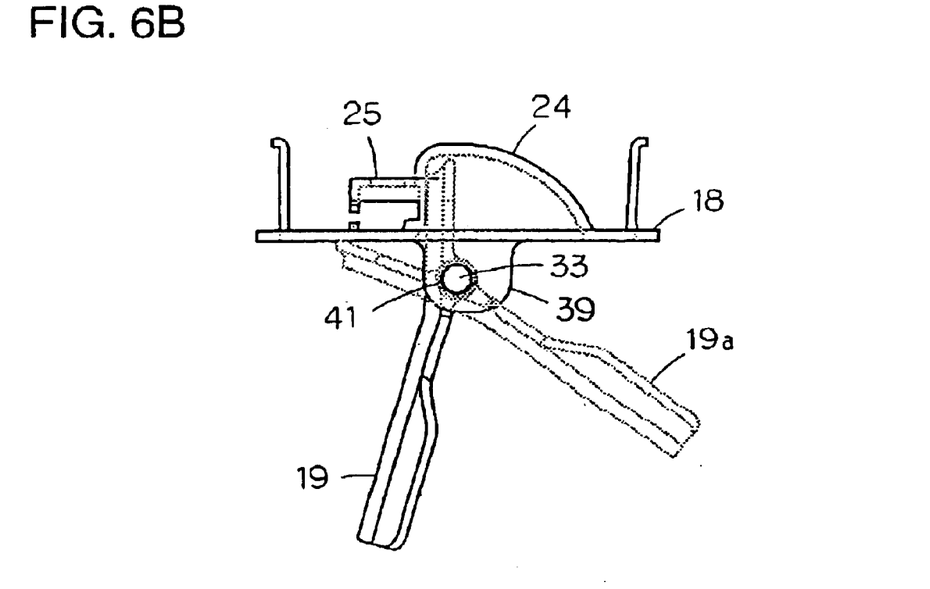

On the other hand, as shown in FIG. 4A, a pair of detecting plate fastening portions 39 and 40 projecting from the lower surface of the base body 21 in parallel with each other are formed in the detecting plate base 18. Holes 41 and 42 are formed in these detecting plate fastening portions 39 and 40, respectively. As shown in FIGS. 6A and 6B, the bosses 33 and 34 of the detecting plate 19 are loosely fitted in the holes 41 and 42, respectively. Thereby, the detecting plate 19 is mounted on the detecting base 18 so as to be rotatable about the bosses 33 and 34.

The magnet 37 embedded in the tip end portion of the detecting plate 19 is rotated within the circular arc portion 24 of the detecting plate base 18 in accordance with the rotation of the detecting plate 19. Normally, the magnet 37 faces through the wall surface of the circular arc portion 24 the detecting surface of the lead switch 20 held on the switch holding portion 25. The magnet 37 is away in a perpendicular direction from the detecting surface of the lead switch 20 when the detecting plate 19 rotates.

Incidentally, as in the detecting plate 19a shown in FIG. 6B, when the magnet 37 is mounted on the detecting plate 18 under the condition that it is slanted and does not enter the circular arc portion 24, it is impossible to correctly detect the amount of stored ice. If the detecting plate 19 is to be slanted and incorrectly mounted, a projecting portion 43 of the detecting plate 19 shown in FIG. 5A interferes with the detecting plate fastening portion 39 of the detecting plate base 18 to prevent the completion of thus erroneous mounting operation.

Also, if the detecting plate 19 is mounted on the detecting plate base 18 inside out, since the distance between the magnet 37 and the detecting surface of the lead switch 20 is different, it is impossible to detect a predetermined detecting signal from the lead switch 20. Accordingly, the diameters of the bosses 33 and 34 of the detecting plate 19 are made different from each other and correspondingly, also, the diameters of the holes 41 and 42 of the detecting plate base 18 are made different from each other, and thereby it is possible to avoid the erroneous upside-down mounting of the detecting plate 19. For example, the diameters of the bosses 33 and 34 may be 5.5 mm and 6.5 mm, respectively, and the diameters of the holes 41 and 42 may be 6.0 mm and 7.0 mm, respectively.

Figure 7A:
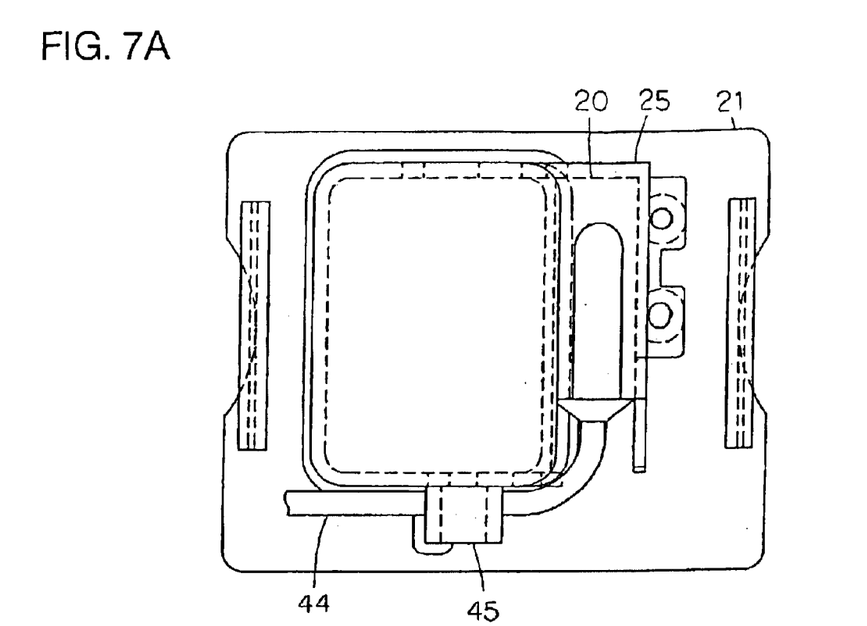
FIGS. 7A and 7B are a plan view and a side view showing the detecting plate base on which a lead switch is mounted, respectively.
Figure 7B:
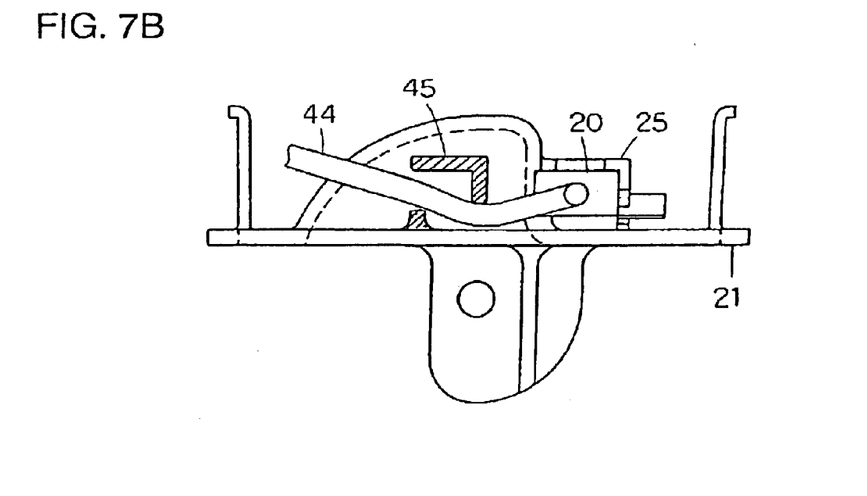

As shown in FIG. 7A, a lead line fastening portion 45 for pressing a lead line 44 of the lead switch 20 held on the switch holding portion 25 is formed on a top surface of the base body 21 of the detecting plate base 18. By this lead line fastening portion 45, as shown in FIG. 7B, the intermediate portion of the lead line 44 is fixed to a position lower than the joint portion with the lead switch 20. With such an arrangement, in the case where dew drop adheres to the lead line 44, the dew drop reaches the intermediate portion fixed to the lead line fastening portion 45 along the lead line 44 but does not reach the lead switch 20 because the joint portion with lead switch 20 is at a higher level. Thus, the invasion of the dew drop to the lead switch 20 may be prevented.

Figure 8:
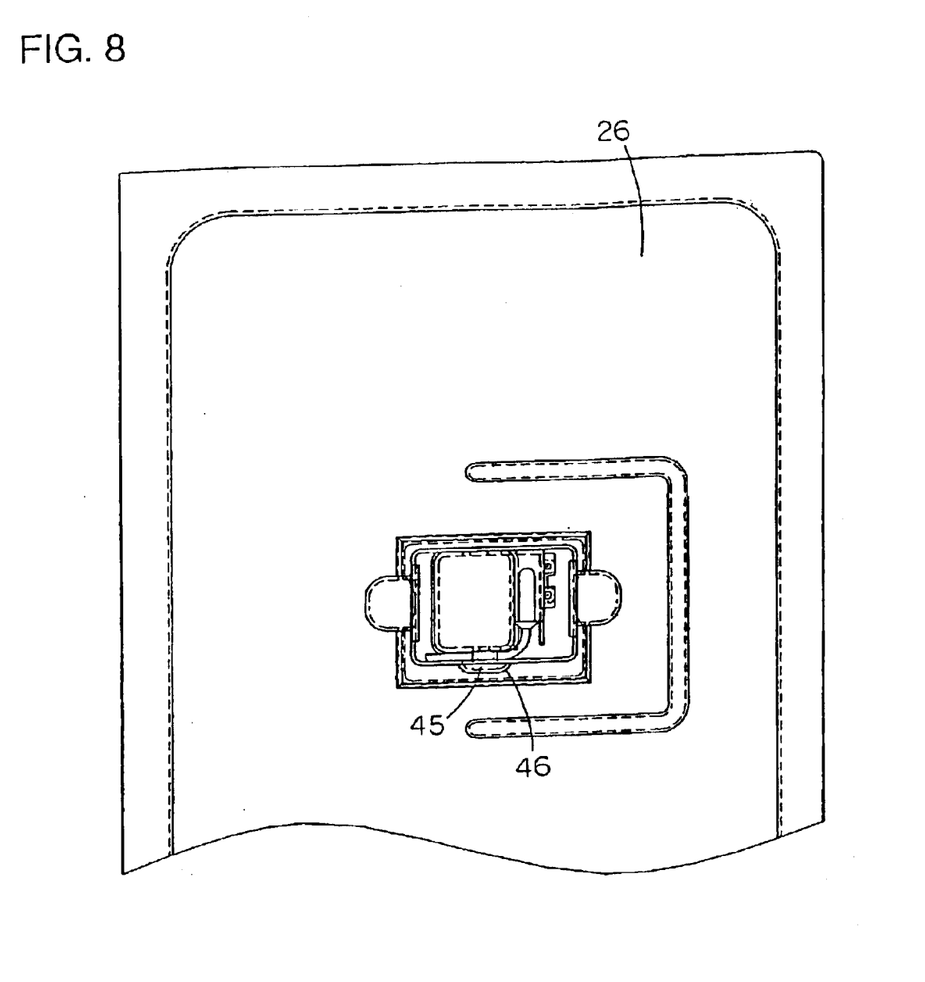
FIG. 8 is a plan view showing the top plate of the ice storing chamber on which the apparatus for detecting an amount of stored ice is mounted.

As shown in FIG. 8, a recessed portion 46 having such a size that the lead line fastening portion 45 of the detecting plate 18 may be received is formed adjacent to the opening portion 28 in the resin portion 26 of the top plate 16 of the ice storing chamber 11. Due to the existence of such a recessed portion 46, even if the detecting plate base 18 is to be mounted in an erroneous direction, the detecting plate base 18 may not be inserted into the opening portion 28. Accordingly, it is possible to prevent the impossibility of detection in advance due to the erroneous mounting.

Figure 9A:
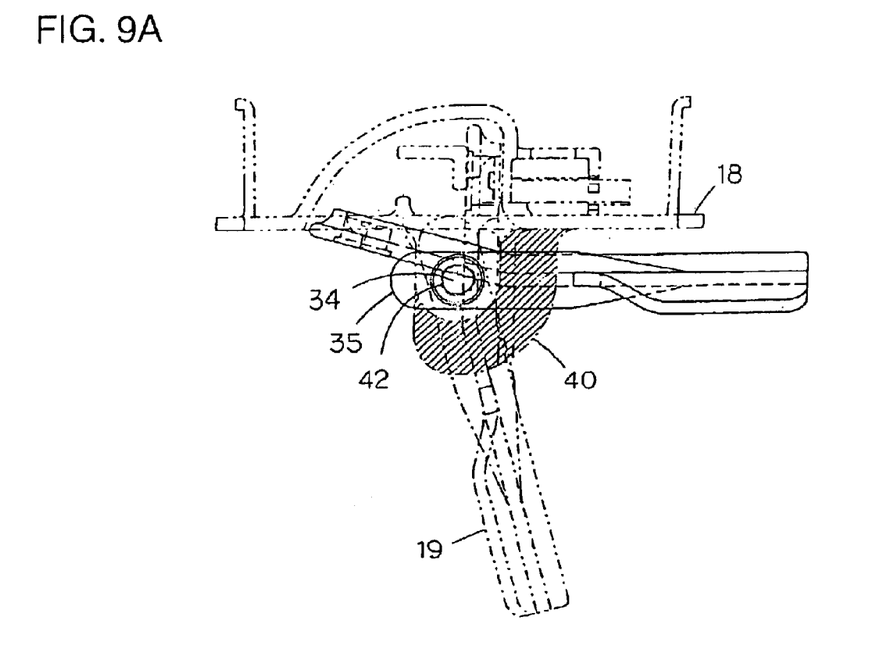
FIGS. 9A and 9B are a side view and a plan view showing the detecting plate mounted on the detecting plate base, respectively.

As shown in FIG. 9A, the boss 34 formed on the arm portion 35 of the detecting plate 19 is inserted into the hole 42 of the detecting plate fastening portion 40 of the detecting plate base 18. The detecting plate fastening portion 40 is located outside the arm portion 35 and also serves as a guard to cover the arm portion 35 as indicated by the hatched portion. With this guard, for example, when the user picks up ice within the ice storing chamber 11 with a shovel, it is possible to avoid the situation that a tip end of the shovel is brought into collision with the arm portion 35 to bend the arm portion 35.

Figure 9B:
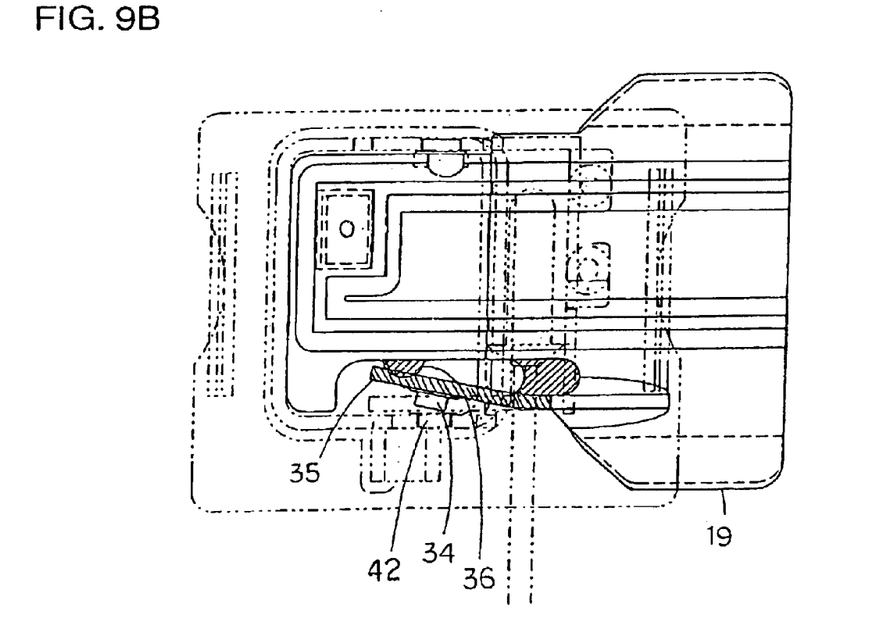

Also, even if the tip end of the shovel happens to be brought into abutment with the arm portion 35, since the bend stop 36 is formed on the detecting plate body 32 of the detecting plate 19, there is no fear that the arm portion 35 will be excessively bent as shown in FIG. 9B. Thus, it is possible to avoid the situation that the detecting plate 19 is removed from the detecting plate base 18 or the arm portion 35 is damaged.

As shown in FIGS. 3A and 3B, the top plate 16 of the ice storing chamber 11 is composed of the resin portion 26 and the heat insulating portion 27. These components are formed integrally with each other, or brought into intimate contact with each other by foaming of the heat insulating portion 27 under the condition including the resin portion 26, or brought into intimate contact with each other without any gap by adhesives or the like between the heat insulating portion 27 and the resin portion 26 formed with high precision, respectively, and thereby the resin portion 26, cooled down by cold air of the ice storing chamber 11 where the ice is stored, is not brought into direct contact with the air outside of the ice storing chamber. For this reason, the air outside of the ice storing chamber is prevented from being cooled down to become dew.

Figure 10:
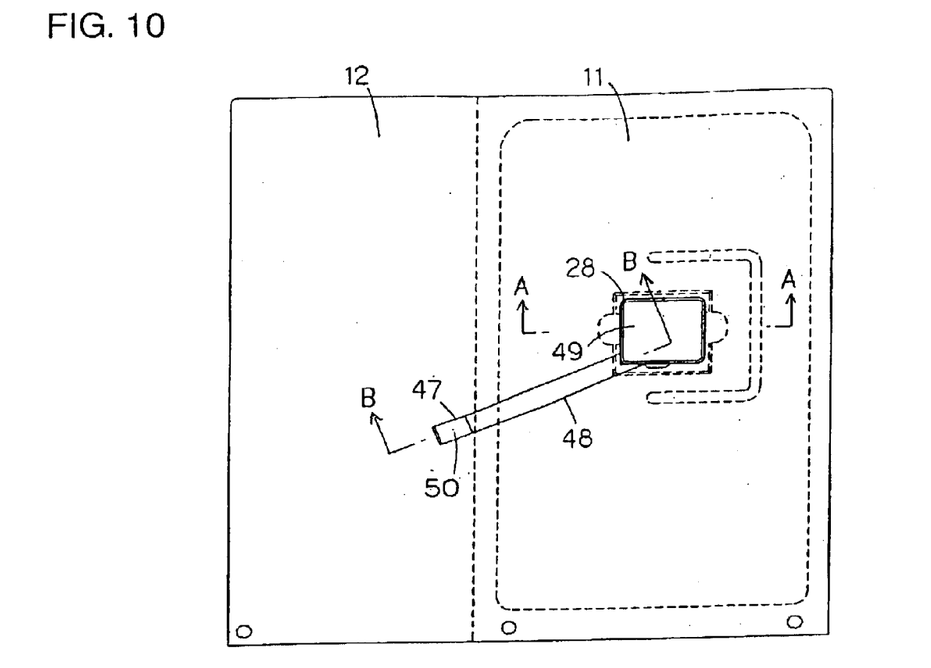
FIG. 10 is a plan view showing the top plate of the ice maker.
Figure 11A:
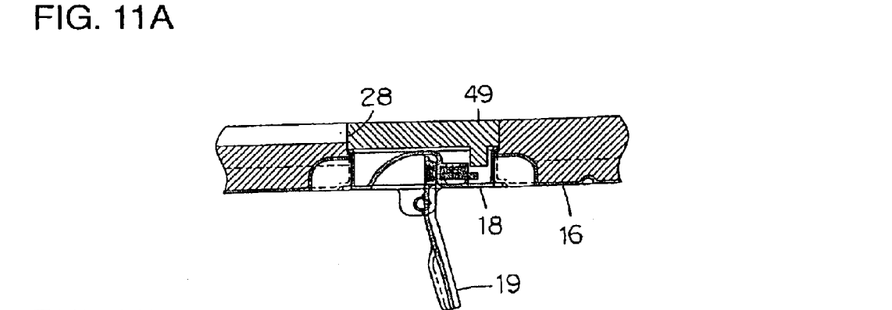
FIGS. 11A and 11B are a cross-sectional view taken along the line A—A of FIG. 10 and a cross-sectional view taken along the line B—B of FIG. 10, respectively.
Figure 11B:
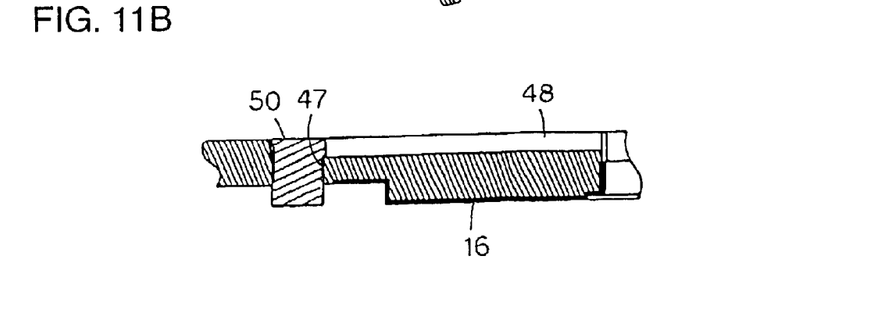

As shown in FIG. 10, in the top plate 16, a though-hole.47 is formed on the side of the machine chamber 12 in addition to the opening portion 28 on the side of the ice storing chamber 11 and a connector passage 48 for connecting the opening portion 28 and the through-hole 47 with each other is formed. The connector passage 48 is a passage for receiving the lead line 44 from the lead switch 20 of the apparatus for detecting an amount of stored ice 17 connected with a control portion (not shown) arranged in the machine chamber 12. The connector passage 48 may be used also to feed a connector for connecting the lead switch 20 to the side of the machine chamber 12 when the lead switches 20 are exchanged in maintenance. As shown in FIGS. 11A and 11B, the connector passage 48 has a groove shape formed in the upper portion of the heat insulating portion 27. In order to prevent the air having a high temperature within the machine chamber 12 from entering the inside of the ice storing chamber 11 through the connector passage 48, a heat insulating material 49 is filled in the opening portion 28 of the top plate 16 and a heat insulating material 50 is filled in the through-hole 47.

Figure 12A:
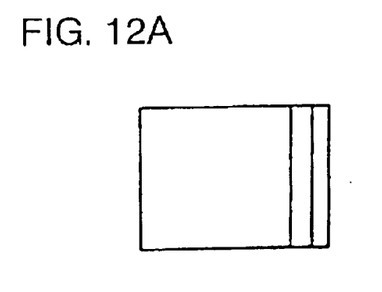
FIGS. 12A to 12C are a plan view, a front view and a side view showing heat insulating material to be inserted into an opening portion of the top plate, respectively.
Figure 12B:
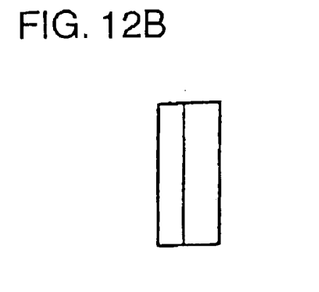
Figure 12C:
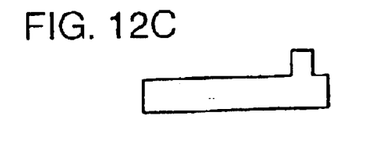
Figure 13A:
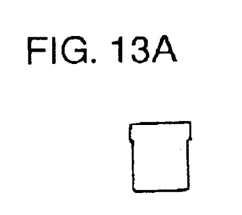
FIGS. 13A and 13B are a front view and a side view showing the heat insulating material to be inserted into a through-hole of the top plate, respectively.
Figure 13B:
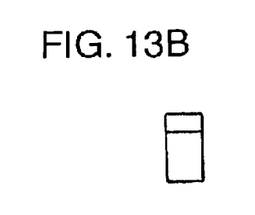

The heat insulating material 49 and the heat insulating material 50 are formed of material such as foamed polypropylene or the like that is abundant in elasticity into a substantially flat shape as shown in FIGS. 12A to 12C and into a T-like shape as shown FIGS. 13A and 13B, respectively. These heat insulating members 49 and 50 are formed into sizes that are somewhat greater than the corresponding opening portion 28 and through-hole 47 and fitted into the opening portion 28 and the through-hole 47, respectively, under the somewhat shrunk condition to thereby avoid the gap to prevent the air from entering.

The upper half portion of each of the opening portion 28 and the through-hole 47 is formed to be narrower than its lower half portion. The heat insulating member 49 is inserted into the upper half portion of the opening portion 28 and the T-shape of the heat insulating member 50 is fitted with the shape of the through-hole 47 to be prevented from falling off, respectively. However, since both of the insulating members 49 and 50 are abundant in elasticity, it is possible to mount or remove the members from below the opening portion 28 and the through-hole 47.

Figure 14A:
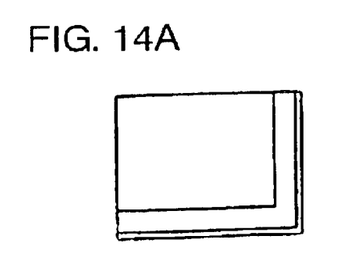
FIGS. 14A to 14C are a plan view, a front view and a side view showing other heat insulating material to be inserted into the opening portion of the top plate, respectively.
Figure 14B:
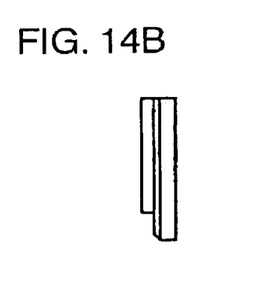
Figure 14C:
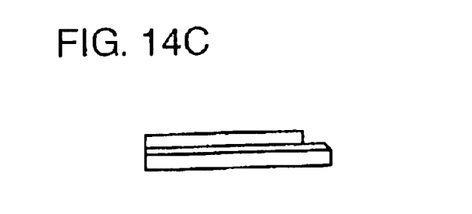

Incidentally, one having a shape shown in FIGS. 14A to 14C may be used as the heat insulating member 49 to be fitted in the opening portion 28.

As described above, since the apparatus for detecting an amount of stored ice 17 according to this embodiment may be attachably and detachably fitted in the opening portion 28 of the top plate 16 of the ice storing chamber 11 without any fastening component such as a screw, it is possible to easily remove the device from the inside of the ice storing chamber 11 and to facilitate the maintenance such as exchange, repair, cleaning of the components.

As shown in FIG. 6A, when the amount of ice within the ice storing chamber 11 is small, the detecting plate 19 is in the normal position P. When the ice storing chamber 11 is fully filled with ice, the detecting plate 19 is brought to the horizontal position Q. Between these positions, the gap formed between the end portion of the detecting plate 19 where the magnet 37 is embedded and the circular arc portion 24 of the detecting plate base 18 is small. Therefore, there is almost no fear that the ice or the like will be clamped in this gap. Also, even if a small piece of ice enters the circular arc portion 24 from this gap, the small piece of ice slidingly drops along the surface of the detecting plate 19 before the detecting plate 19 is returned from the horizontal position Q back to the normal position P. There is no fear that the ice will be clamped between the lead switch 20 and the magnet 37.

Although in the above-mentioned embodiment the apparatus for detecting an amount of stored ice 17 is mounted on the top plate 16 of the ice storing chamber 11, the invention is not limited thereto. It is possible to mount the device on a wall surface within the ice storing chamber 11, for example, at an upper portion of the side wall.

Also, this invention may be applied not only to the ice maker but also to various equipment having an ice storing chamber, widely.

As described above, according to the present invention, since the detecting plate base is detachably fitted from the inside of the ice storing chamber to the opening portion formed in the wall surface of the ice storing chamber and the detecting means for detecting the storage of the predetermined amount of ice is mounted on this detecting plate base, it is possible to easily mount or remove the device from the inside of the ice storing chamber without any fastening components, to dispense with a tool such as a driver in maintenance and to quickly perform the maintenance work with ease.

If the detecting means includes a detecting plate mounted on the detecting plate base so as to be rotated by the ice when the predetermined amount of ice is stored in the ice storing chamber and a switch for detecting the rotation of the detecting plate, the detecting plate has an arm portion that may be elastically deformed and a boss formed on this arm portion is loosely fitted in a hole formed in the detecting plate base and the detecting plate base has a guard for covering the arm portion of the detecting plate. Accordingly, it is possible to avoid the situation that a shovel or the like is brought into contact with the arm portion of the detecting plate so that the detecting plate is removed from the detecting plate base or the erroneous detection.

If a lead line fastening portion is formed on the detecting plate base to fix an intermediate portion of a lead line connected to the switch and a recessed portion for receiving this lead line fastening portion is formed adjacent to the opening portion in the top plate of the ice storing chamber, it is possible to avoid the detection impossibility due to the erroneous mounting of the detecting plate base to the opening portion.

If a heat insulating material is fitted attachably and detachably from the interior of the ice storing chamber above the detecting plate base within the opening portion of the top plate of the ice storing chamber, it would be difficult for dew to be formed on the top plate of the ice storing chamber and the switch.

Since the fastening component such as a screw is not used, the apparatus for detecting an amount of stored ice according to this invention is not subject to corrosion such as rust as in the case where a metal screw is used. Also, since the fastening component is not used, the number of assembling steps is considerably reduced. Also, the number of the components is decreased to save costs and to prevent the generation of faults due to the loosening of the fastening components.

What is claimed is:

1. An apparatus for detecting an amount of stored ice, said apparatus comprising:

a detecting plate base attachably and detachably fitted from an interior of an ice storing chamber to an opening portion formed in a wall surface of the interior of the ice storing chamber; and a detecting plate mounted on a lower surface of said detecting plate base on the side of the ice storing chamber so as to be rotated by the ice when a predetermined amount of ice is stored in the ice storing chamber; and a switch mounted on the top surface of said detecting plate base for detecting the rotation of the detecting plate.

2. An apparatus according to claim 1, wherein the detecting plate has an arm portion that may be elastically deformed and a boss formed in the arm portion loosely fitted in a hole formed in said detecting plate base; and said detecting plate base has a guard for covering the arm portion of said detecting plate.

3. An apparatus according to claim 2, wherein said detecting plate base comprises a lead line fastening portion received in a recessed portion formed adjacent to the opening portion in the top plate of the ice storing chamber for fixing an intermediate portion of a lead line connected to said switch.

4. An apparatus according to claim 1, further comprising a heat insulating material fitted attachably and detachably from the interior of the ice storing chamber above said detecting plate base within the opening portion of the top plate of the ice storing chamber.

5. An apparatus according to claim 1, wherein said detecting plate base comprises a pair of elastically deformable claw portions for engaging the opening portion of the ice storing chamber.

6. An apparatus according to claim 5, wherein each of said elastically deformable claw portions extends substantially perpendicularly from a base body of said detecting plate base.

7. An apparatus according to claim 1, wherein said detecting plate base comprises an elastically deformable switch holding portion for holding said switch mounted on the top surface of said detecting plate base.

8. An apparatus according to claim 1, wherein said detecting plate includes a magnet embedded in an end portion of said detecting plate.

9. An apparatus according to claim 8, wherein said detecting plate base includes a circular arc portion forming a recess on the lower surface of said detecting plate base for receiving the end portion of said detecting plate.

* * * * *